Oct. 17, 1967　　　　　H. F. STORM　　　　　3,348,128
PHASE CONTROLLED ALTERNATING CURRENT POWER CIRCUITS
　　　　USING BIDIRECTIONAL CONDUCTING DEVICES
Filed June 26, 1964　　　　　　　　　　　　　　8 Sheets-Sheet 1

Inventor:
Herbert F. Storm,
by Charles W. Helzer
His Attorney.

Inventor:
Herbert F. Storm,
by Charles W. Helzer
His Attorney.

Inventor:
Herbert F. Storm,
by Charles W. Helzer
His Attorney.

Inventor:
Herbert F. Storm,
by Charles W Helzer
His Attorney.

United States Patent Office 3,348,128
Patented Oct. 17, 1967

3,348,128
PHASE CONTROLLED ALTERNATING CURRENT POWER CIRCUITS USING BIDIRECTIONAL CONDUCTING DEVICES
Herbert F. Storm, Delmar, N.Y., assignor to General Electric Company, a corporation of New York
Filed June 26, 1964, Ser. No. 378,378
9 Claims. (Cl. 323—4)

ABSTRACT OF THE DISCLOSURE

To compensate for the tendency of an unsymmetrical load to saturate an A-C supply transformer, a current transformer is coupled to the supply transformer for sensing the undesired D-C component and deriving an output control signal pulse which is applied to the firing circuit of a diac or triac bidirectional conducting device. A compensating D-C component is produced by turning on the device at different phases of the half cycles of the A-C supply potential and is applied to the supply transformer secondary windings by means of an auxiliary secondary winding or by connecting the load in series with the diac or triac and the secondary winding to correct the load current.

This invention relates to phase controlled alternating current power circuits using bidirectional conducting devices.

More particularly, the invention relates to phase controlled alternating current power circuits employing single phase supply transformers and bidirectional conducting devices, and wherein saturation effects of the supply transformer are minimized.

Many alternating current power circuits employ single phase transformers to supply alternating current electric potential to various branches of the circuit. One of the problems associated with the use of single phase supply transformers in alternating current power circuits arises because of the unsymmetrical loading of the transformer as, for example, when the load contains direct current components, because of the presence of a rectifier in the load being supplied by the transformer. Under such conditions the supply transformer may become saturated at some point in one of the half cycles of the supply alternating current potential. The effect of saturation of the supply transformer is the distortion of the resulting output wave shape and higher core losses giving rise to a demand for a larger transformer to overcome these undesired effects. As a consequence, for any given alternating current circuit of a stated power rating, the size and hence, cost of the supply transformer employed must be considerably increased. To overcome this requirement, the present invention was devised.

It is, therefore, a primary object of the present invention to provide a family of new and improved phase controlled alternating current power circuits employing supply transformers and solid state bidirectional conducting devices to overcome saturation effects of the supply transformer.

In practicing the invention a phase controlled alternating current power circuit is provided which includes a supply transformer and sensing means for sensing undesired saturation effects in the supply transformer and deriving control signal pulses having a polarity, magnitude and phase dependent upon the saturation effects to be corrected. A conductivity controlled bidirectional conducting device is operatively coupled to the electric power circuit including the supply transformer and is responsive to the control signal pulses produced by the sensing means whereby the phase of the turn-on time of the bidirectional conducting device is controlled with respect to the supply alternating current potential in a manner to minimize the saturation effects of the supply transformer.

Other objects, features and many of the attendant advantages of this invention will be appreciated more readily as the same becomes better understood by reference to the following detailed description, when considered in connection with the accompanying drawings, wherein like parts in each of the several figures are identified by the same reference character, and wherein;

Figure 1:
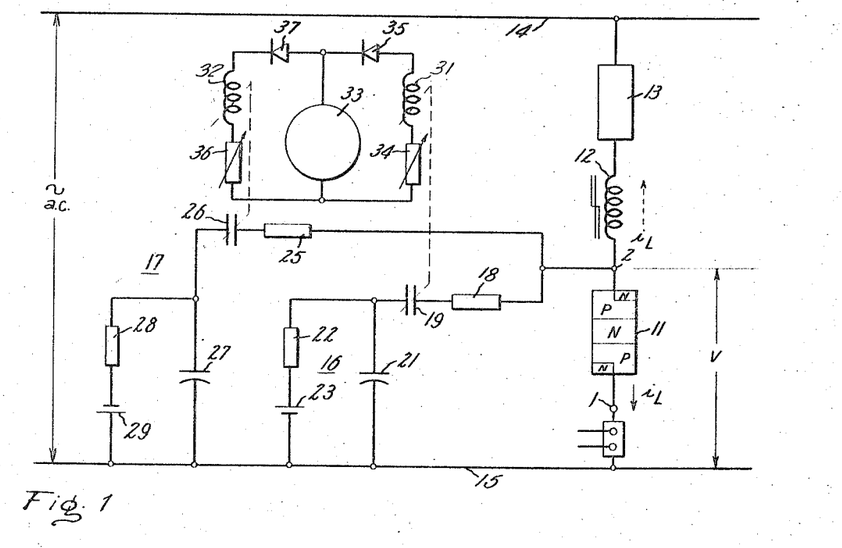
FIGURE 1 is a schematic circuit diagram of a phase controlled power circuit for a five layer semiconductor conductivity controlled diac bidirectional conducting power device.

The circuit arrangement shown in FIGURE 1 of the drawings is comprised by a diac bidirectional conducting power device 11 connected in series circuit relationship with the small saturable core 12 and a load resistor 13 across a pair of power supply terminals 14 and 15. The power supply terminals 14 and 15 in turn are connected across a conventional 60 cycle alternating current power source. The diac bidirectional conducting power device 11 is a five-layer semiconductor NPNPN junction bidirectional conducting device such as described more fully in an article entitled "Two-Terminal Asymmetrical and Symmetrical Silicon Negative Resistant Switches" by R. W. Aldrich and N. Holonyak, Jr., appearing in the "Journal of Applied Physics," vol. 30, No. 11, November 1959, pages 1819–1824. Briefly, however, it can be stated that the diac bidirectional conducting power device 11 can be designed to switch large (power level) currents in the order of 50 to 125 amperes at 250 volts. The power diac can be switched from its nonconducting blocking condition to its conducting condition by the application of a sharp voltage rise across its load terminals 1 and 2 to conduct current in either direction through the device as determined by the polarity of the applied alternating current potential supplied to the terminals 14 and 15.

In order to turn-on the power diac bidirectional conducting device 11 and render it conductive, the load terminals 1 and 2 of the device are connected across a pair of firing circuits 16 and 17 respectively. The firing circuit 16 is comprised by a current limiting resistor 18, a first set of relay operated contacts 19 connected in series circuit relationship with a parallel charging network comprised by a capacitor 21, a resistor 22, and a battery 23 or other suitable source of direct current electric potential. By this arrangement, the battery 23 will charge the capacitor 21 to essentially the full potential of the battery, and upon the contacts 19 being closed, capacitor 21 will serve to drive the potential of the load terminal 2 of diac 11 sharply positive with respect to the load terminal 1. Under these conditions, and assuming that the terminal 14 at that instant is positive with respect to terminal 15 then load current will be conducted through diac 11 in the direction of the solid arrow $i_L$.

The firing circuit 17 is further comprised by a limiting resistor 25 and second set of relay operated contacts 26 connected in series circuit relationship with a parallel connected capacitor 27, resistor 28, and battery 29. It should be noted that the battery 29 or other source of direct current electric potential has its polarity reversed with respect to the battery 23. As a consequence, upon the relay contact 26 being closed, capacitor 27 will drive the potential of the load terminal 2 of diac 11 sharply negative with respect to terminal 1 of power diac 11. As a result, and assuming the terminal 15 is now positive with respect to terminal 14, load current will be conducted through diac 11 in the reverse direction shown by the dotted arrow. The contacts 19 and 26 are actuated by their associated relay windings 31 and 32, respectively, to which they are mechanically connected by a solenoid actuated push rod or the like. The relay windings 31 and 32 are in turn energized from a selsyn generator 33 which is supplied from the same 60 cycle alternating current supply connected to the supply terminals 14 and 15. The energizing potential supplied from the selsyn generator 33 is applied to the relay winding 31 through a variable resistor 34 and diode 35, and the relay winding 32 similarly is energized through a variable resistor 36 and associated diode 37. By this arrangement, relay contacts 19 and 26 can be operated synchronously with the alternating current supply voltage applied across the terminals 14 and 15, or by varying the values of the resistors 34 and 36, varying degrees of phase retardation can be introduced into the time at which the relay contact 19 or 26 close to thereby introduce a phase retardation into the time of conduction of the diac bidirectional conducting power device 11.

Figure 2:
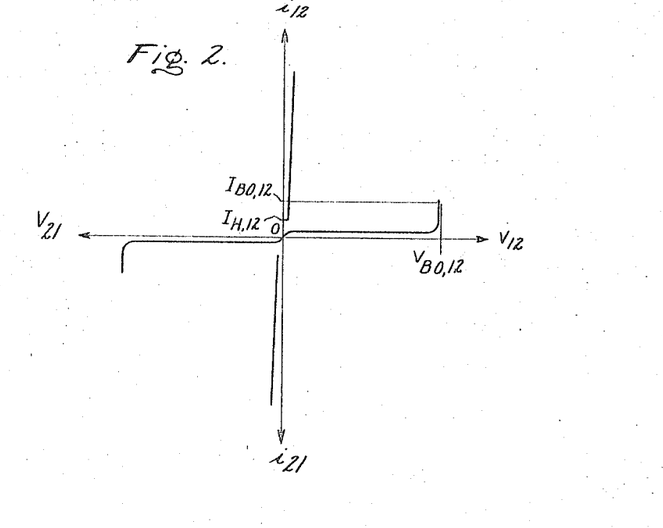
FIGURE 2 is a characteristic curve illustrating the voltage versus current operating characteristics of the diac bidirectional conducting power device.

FIGURE 2 of the drawings illustrates the voltage versus current characteristics of the diac bidirectional conducting device 11 wherein it can be seen that the device can be caused to conduct current irrespective of the polarity of the voltage applied across the device.

Figure 3:
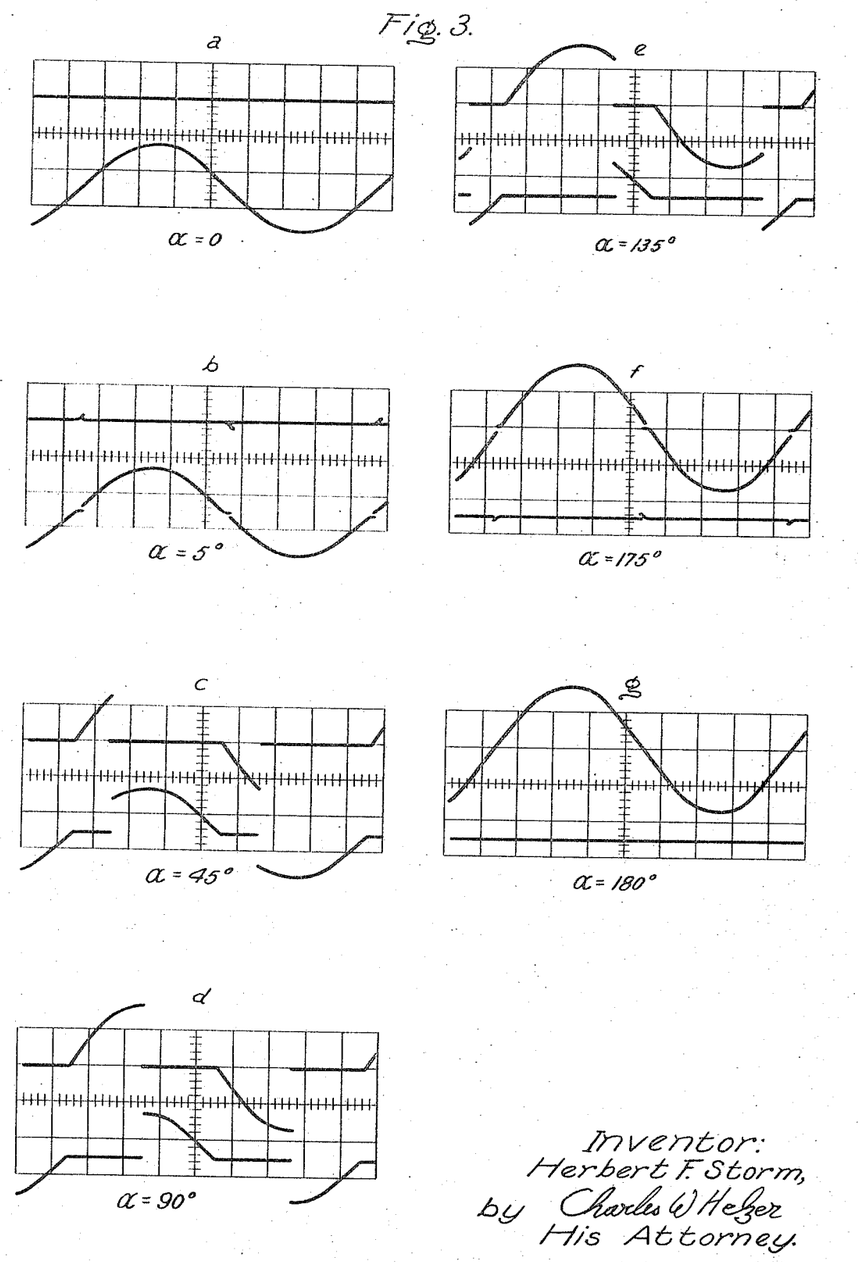
FIGURE 3 is a series of curves illustrating the voltage versus time conducting characteristics of the diac bidirectional conducting power device connected in the circuit arrangement of FIGURE 1 for varying phase angles at which the power diac is rendered conductive with respect to a supply alternating current potential.

FIGURE 3 of the drawings illustrates a series of voltage versus time characteristic curves wherein varying amounts of phase retardation are introduced into the point at which the bidirectional conducting power diac device is rendered conductive with respect to the phase of the alternating current supply potential. In these figures, the upper trace shows the voltage appearing across the power diac device 11, and the lower trace illustrates the load current $i_L$ flowing through the device. Accordingly, it can be appreciated that where no phase retardation is introduced into the time of firing the diac, there is practically zero voltage continuously across the diac 11, and a full wave of load current flows through the load resistor 13 as shown in FIGURE 3(a) of the drawings.

In FIGURES 3(b) through 3(g) varying amounts of phase retardation are introduced into the time of firing of the power diac 11. From an examination of these curves it can be appreciated that correspondingly varying amounts of voltage appearing across the diac, and varying values of load current are caused to flow in the circuit arrangement of FIGURE 1. Specifically, FIGURE 3(b) illustrates a condition for phase retardation of five degrees; FIGURE 3(c) shows a phase retardation of 45°; FIGURE 3(d) illustrates the condition for a phase retardation of 90°; FIGURE 3(e) shows the voltage and load current for phase retardation of 135°; FIGURE 3(f) for a 170°; and FIGURE 3(g) for 180°. From a comparison of FIGURE 3(a) and FIGURE 3(g), it can be appreciated that the circuit goes from a condition of essentially full voltage across the load and no voltage across the diac device 11, to a condition where there is essentially full voltage across the diac device, and no voltage across the load. It should also be noted that essentially continuous control can be obtained from the 0 to 180° phase retardation condition without any instability. During turn on, the small saturable reactor 12 holds off the firing potential applied across terminals 1 and 2 for only a short time period to cause a sharp increase in voltage across power diac 11 to thereby cause it to turn on more quickly than if the reactor 12 were not present.

Figure 6:
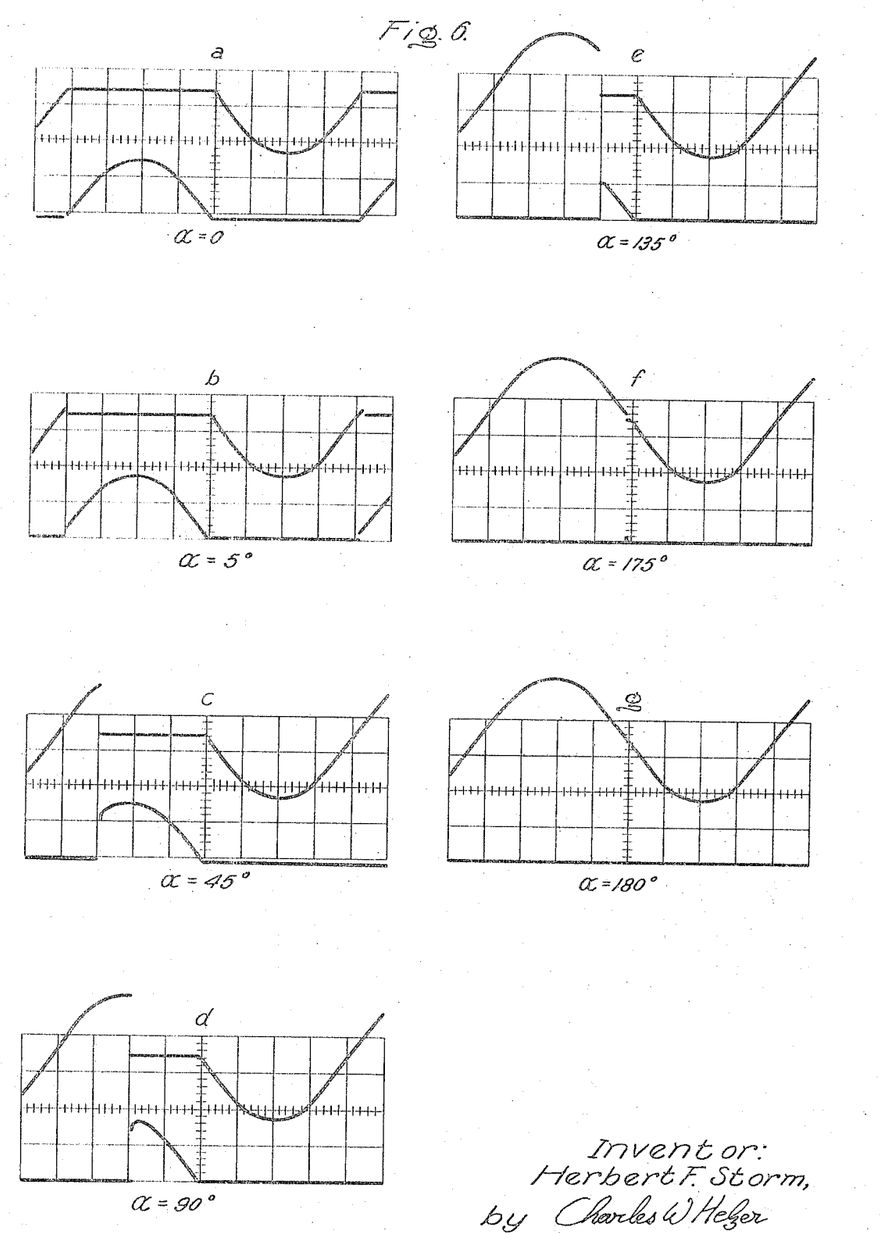
FIGURE 6 is a series of curves illustrating the operating characteristics of the diac bidirectional conducting device when operated as a phase controlled half-wave rectifier.

With one of the relay coils 31 or 32 disconnected, the diac bidirectional conducting device 11 of FIGURE 1 will operate as a phase controlled rectifier. Operation of the circuit of FIGURE 1 in this manner is illustrated in FIGURE 6 of the drawings wherein FIGURE 6(a) illustrates the voltage across the diac 11 is zero from 0 to 180° and appears from 180 to 360° where there is no phase retardation introduced into the time of firing of the diac. As a consequence, load current will flow for one-half cycle as in a rectifier. FIGURES 6(b) through 6(g) illustrate the condition for varying amounts of phase retardation introduced into the time of firing of the diac 11 wherein it can be seen that the current wave shapes are similar to those that can be obtained with a conventional SCR using phase control. If the other one of the two relay windings 31 or 32 were disconnected so that the alternate voltage spike were used to turn on the diac 11, a similar control would be achieved except that the load current flow would be in the opposite direction. Accordingly, it can be appreciated that if the load resistor 13 were replaced by the armature of a shunt field excited motor, one could not only control the speed of the motor by controlling the firing angle, but could also control the direction of rotation by supplying firing spikes of one direction or the other to the power diac 11.

Figure 4:
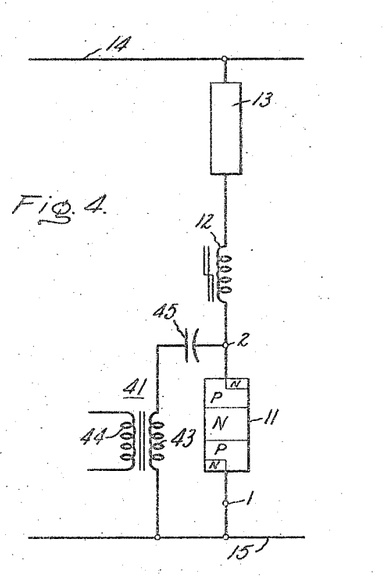
FIGURE 4 is a partial schematic circuit diagram of an alternative firing circuit arrangement for the power diac.
Figure 5:
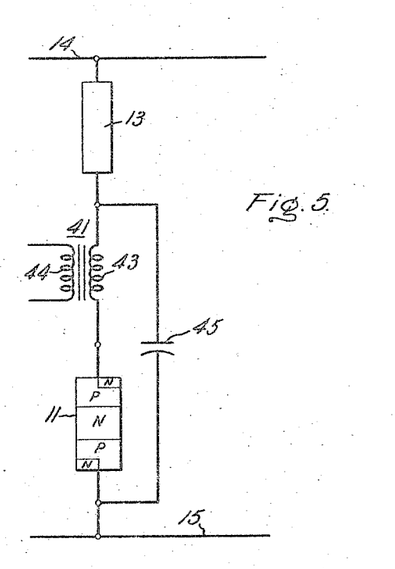
FIGURE 5 is a schematic diagram of still another form of firing circuit arrangement for the diac bidirectional conducting power device used in the phase control firing circuit of FIGURE 1.

FIGURES 4 and 5 of the drawings illustrate alternative arrangements for firing power diac 11. In the circuit arrangement shown in FIGURE 4, a coupling transformer 41 is used which has its secondary winding 43 connected across the diac 11 through a coupling capacitor 45, and its primary winding could be connected to a phase control circuit such as that shown in FIGURE 1 by connection between the juncture of the limiting resistors 25 and 18 and the terminal 15. In the circuit arrangement of FIGURE 5, the secondary winding 43 of the coupling transformer is connected in series circuit relationship with the diac 11 and load resistor 13 with a capacitor 45 being connected in parallel circuit relationship with the series connected diac 11 and the secondary winding 43. In these arrangements the capacitor 45 provides as direct a path as possible across the terminals of the diac 11 for the voltage spikes used to fire the diac.

Figure 7:
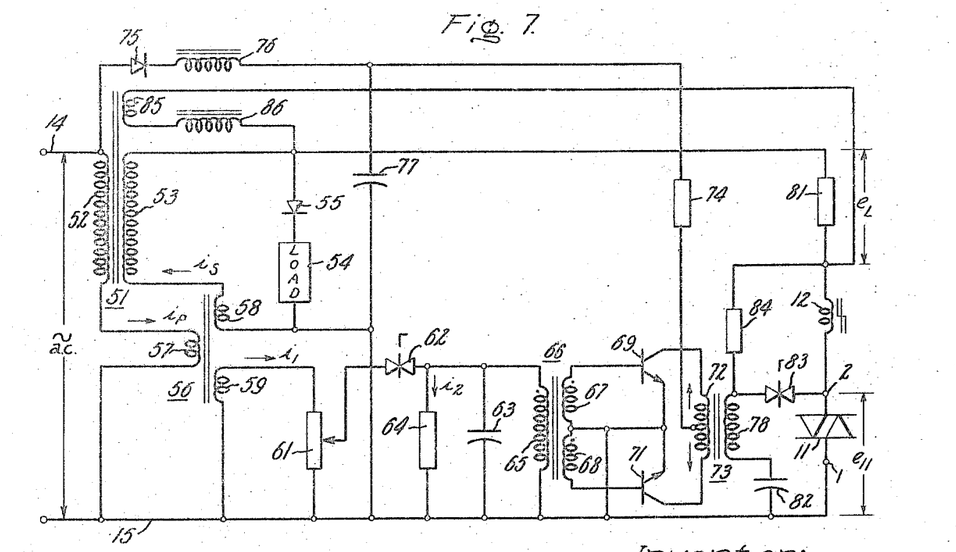
FIGURE 7 is a detailed circuit diagram of a new and improved alternating current power circuit employing a supply transformer and a diac bidirectional conducting device for minimizing saturation effects in the transformer.

FIGURE 7 of the drawings illustrates a practical operating circuit employing a phase controlled power diac bidirectional conducting device 11. The circuit of FIGURE 7 comprises a new and improved alternating current power circuit employing a supply transformer and means (including a power diac) for preventing saturation of the supply transformer during one-half cycle of an applied alternating current supply potential. The circuit arrangement of FIGURE 7 is comprised by an alternating current supply transformer 51 having its primary winding 52 connected across a source of alternating current potential. The secondary winding 53 of the supply transformer 51 is connected across a load 54 connected in series circuit relationship with a rectifier 55 which together operate as an unsymmetrical load on the secondary winding 53. As a result of the unsymmetrical nature of the load 54 and 55, the supply transformer 51 will tend to saturate during one half cycle of the applied alternating current potential. This is caused by the direct current component flowing in the secondary winding 53 as a result of the presence of the rectifier 55, which in effect causes the secondary winding 53 to be unsymmetrically loaded.

Figure 9:
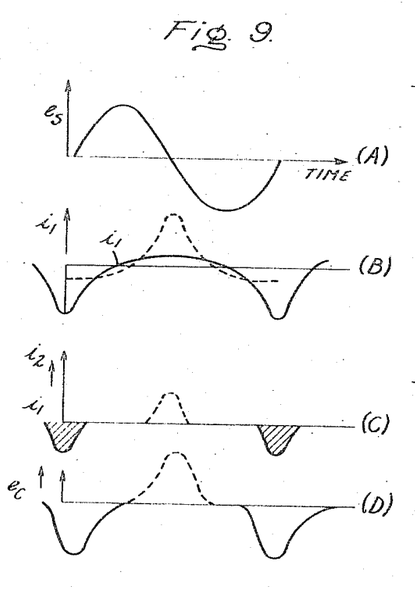
FIGURE 9 is a series of curves illustrating the operation of the current transformer for sensing saturation effects in the supply transformer of FIGURES 7 or 8.

FIGURE 9 of the drawings illustrates the nature of the phenomenon involved. In FIGURE 9(A) the voltage versus time characteristic of the applied alternating current potential is plotted. FIGURE 9(B) illustrates the nature of the magnetizing current which flows in the secondary winding 53 due to the saturation effect during one-half cycle of the applied alternating current potential. This magnetizing current is the difference between the currents flowing in the primary winding 52 and the secondary winding 53, and for the circuit arrangement shown in FIGURE 7 results in the current peaks shown in FIGURE 9(B) in solid lines. In the event of the reversal of the connection of the diode rectifier 55, saturation of the supply transformer would take place on the other side of the hysteresis loop of its core, and the wave shape of the curve shown in FIGURE 9(B) would be shifted 180°, and its polarity reversed as illustrated by the dotted curve in FIGURE 9(B). Accordingly, it can be appreciated that the position of the current peaks in FIGURE 9(B) and their polarity provide one with information as to which side of the hysteresis loop of the transformer core the transformer is saturating, and the height or magnitude of the peak provides one with the information of the degree of saturation.

In order to derive the above described information, a current transformer sensing means 56 is provided which includes the two primary windings 57 and 58 and output winding 59. The primary winding 57 is connected in series circuit relationship with the primary winding 52 of supply transformer 51, and the primary winding 58 is connected in series circuit relationship with the secondary winding 53 of supply transformer 51. By placing these two windings on a common core and properly proportioning the turns ratios of the two primary windings 57 and 58, the current $i_1$ induced in the output winding 59 will be a replica of the magnetizing current tending to drive the supply transformer 51 into saturation. This current is the difference between the current flowing in the primary winding 52 and the current flowing in the secondary winding 53. The magnetizing current $i_1$ is illustrated in the solid line curves of FIGURE 9(B). It, of course, follows that if the opposite side of the hysteresis loop of the core of supply transformer 51 is being saturated, then the current $i_1$ would be as shown in the dotted curve of FIGURE 9(B).

The replica of the magnetizing current $i_1$ derived by the current transformer sensing means 56 is then supplied to a potentiometer comprised by variable resistor 61 where it develops a voltage that is applied to an avalanche operated conductivity controlled bidirectional conducting device 62. The avalanche operated conductivity controlled bidirectional conducting device 62 may comprise any conventional snap switch device such as a three layer signal diac being manufactured and sold by the General Electric Company, Rectifier Components Department, Auburn, N.Y., a Hunt diode manufactured and sold by the Hunt Electric Manufacturing Company, or a bidirectional conducting Shockley diode. All of these devices are voltage sensitive devices which can break down and conduct current in either one of two directions upon the voltage across the device rising to a predetermined firing level, and upon the voltage across the device dropping below a predetermined holding level, the device reassumes its blocking condition. By proper adjustment of the setting of the variable resistor 61, one can control the potential at which the conductivity controlled bidirectional conducting device 62 breaks down and conducts. Hence, device 62 serves as a clipping device which develops a clipped output current $i_2$ that is supplied to a parallel connected capacitor 63 and resistor 64 connected across the avalanche operated bidirectional conducting device 62. As a result of this arrangement, a voltage $e_c$ will be developed across the capacitor 63 which is illustrated in FIGURE 9(D) of the drawings by the solid line curve. For more intense saturation conditions of the supply transformer 51, the voltage $e_c$ will become larger. If the supply transformer 51 saturates in the opposite direction, that is, it saturates on the opposite side of its hysteresis loop, the polarity of the voltage $e_c$ will be reversed and will be phase shifted by 180° as illustrated in the dotted curve shown in FIGURE 9(D).

The capacitor 63 is coupled across the primary winding 65 of a pulse transformer 66 whose split secondary winding halves 67 and 68 are connected to the base electrodes of a pair of NPN junction transistors 69 and 71, respectively. The transistors 69 and 71 are connected in a conventional alternating current push-pull amplifier arrangement, and for this purpose, the emitter electrodes of the transistors 69 and 71 are connected in common to a mid tap point on the secondary windings 67, 68 of pulse transformer 66 and the collector electrodes of the NPN junction transistors 69 and 71 are connected across a primary winding 72 of an output pulse transformer 73. Operating potentials are supplied to the amplifying means comprised by transistors 69 and 71 from a rectifier power supply comprised by a limiting resistor 74, a rectifier 75 and associated filter network including an inductance 76 and capacitor 77 connected across the alternating current power supply terminals 14 and 15. In order to provide rectified direct current bias potentials to transistors 69 and 71, a limiting resistor 74 is connected to a mid tap point on the output winding 72 of pulse transformer 73, and the emitters of transistors 69 and 71 are connected in common to the power supply terminal 15 which if desired may be grounded. By reason of this arrangement, the voltage pulses $e_c$ which are representative of the undesired magnetizing current flowing in the supply transformer 51 are amplified by push-pull amplifier 69 and 71, and then supplied through output coupling transformer 73 where they are applied across the bidirectional conducting power diac device 11 by the secondary winding 78 of output pulse transformer 73.

The bidirectional conducting power diac device 11 is operatively connected in series circuit relationship with a small saturable core winding 12 and a load resistor 81 across the secondary winding 53 of the supply transformer 51. The power diac device 11 is turned on by a firing circuit means which includes the secondary winding 78 of output pulse transformer 73, a charging capacitor 82, and firing circuit means comprised by a second avalanche operated bidirectional conducting device 83 which is similar in nature to the avalanche operated bidirectional conducting device 62. The capacitor 82, secondary winding 78, and avalanche operated bidirectional conducting device 83 are all connected in series circuit relationship across the diac bidirectional conducting device 11 at a point intermediate the diac 11 and the small saturable reactor winding 12. By this arrangement, current pulses induced in the secondary winding 78 of output pulse transformer 73 will cause the diac bidirectional conducting device 11 to be turned on and rendered conductive in a manner that will be discussed more fully hereinafter.

Upon the diac bidirectional conducting device 11 being turned on and rendered conductive, current flows in the load resistor 81 which will in turn develop a current flow through a small auxiliary winding 85 connected in series circuit relationship with a choke coil 86 across the load resistor 81. The small auxiliary winding 85 is wound on the core of the supply transformer 51 in common with the primary winding 52 and secondary winding 53 in a manner such that the ampere turns induced by the small auxiliary winding 85 oppose the ampere turns of the secondary winding 53. By reason of this arrangement, a direct current component of a proper phase, polarity and magnitude is induced in the small auxiliary winding 85 which is in such a direction as to drive the core of the supply transformer 51 out of saturation thereby obviating any saturation effects in the transformer.

Figure 10:
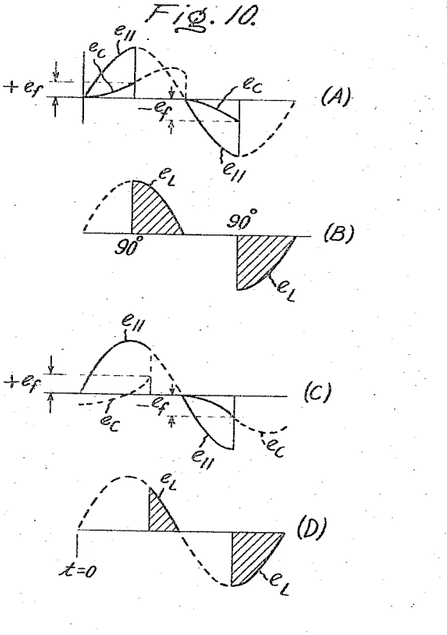
FIGURE 10 is a series of voltage versus time characteristic curves illustrating the time of firing of the conductivity controlled bidirectional conducting device with respect to an alternating current supply potential, and its effect on load current supplied through the device.

The manner in which the compensating D-C component is developed in the small auxiliary winding 85 can best be appreciated in connection with FIGURE 10 of the drawings. As shown in FIGURE 10(A), the voltage $e_{11}$ appearing across the diac bidirectional conducting device 11 is essentially the same as the 60 cycle alternating current supply potential. Ignoring for the moment the effect of the gating pulse supplied to the secondary winding 78, then by reason of this potential the rise in potential of the capacitor 82 indicated at $e_c$ in FIGURE 10(A) will lag the supply potential $e_{11}$ due to the drop in resistor 84, and is adjusted to attain the value $e_f$ at a phase position of 90°. The value $e_f$ is the firing potential of the avalanche operated bidirectional conducting device 83 so that at this point, a firing pulse will be applied across the diac bidirectional conducting device 11. Upon a firing pulse being applied across the diac bidirectional conducting device 11, the load terminal 2 of the device will be driven sharply positive with respect to the load terminal 1. It should be noted that during this firing interval the small saturable reactor 12 will hold off the firing potential sufficiently to give rise to this sharp rise in potential of the load terminal 2 thereby causing the diac 11 to be rendered fully conductive almost instantaneously. As a consequence of diac 11 being rendered conductive, the voltage $e_{11}$ across the diac drops essentially to zero as shown in FIGURE 10(A) and the voltage across the load resistor 81 shown as $e_L$ in FIGURE 10(B) will rise sharply to essentially the full potential of the alternating current power supply. During the succeeding half cycle of the supply alternating current potential, substantially the same process will occur but in a reverse polarity sense to develop across the load resistor 81 an alternating current potential having the wave shape $e_L$ shown in FIGURE 10(B).

Consider now the effect of the current pulse applied to the capacitor 82 by output pulse transformer 73. If capacitor 82 were biased with a negative charge at the time $t=0$, it can be appreciated from an examination of FIGURE 10(C) that it will take more time for the capacitor voltage $e_c$ to reach the diode breakdown firing voltage $e_f$ in comparison to the time required to reach the same voltage under the circumstances plotted in FIGURE 10(A).

Hence, the time of firing of the diac 11 during the positive half cycle of the applied alternating current potential will be delayed in the manner shown in FIGURE 10(C). The result is a reduction in the average value of the load voltage $e_L$ during the positive half cycle of the supply voltage from 0 to 180° as shown in FIGURE 10(B). If no bias is applied to the capacitor 82 during the following negative half cycle of the supply voltage from 180° to 360°, the load voltage $e_L$ will remain the same as shown in FIGURE 10(B). It follows, therefore, that the biasing of the capacitor 82 by the current supplied from pulse transformer 73 results in a load voltage $e_L$ which now has a direct current component. If the capacitor 82 is biased with a larger charge, the direct current component will also be larger. Further, if the capacitor 82 is biased with a reversed polarity charge that is phase displaced by 180 electrical degrees, the direct current component in the resulting load voltage $e_L$ will also have the opposite direction and a magnitude dependent upon the magnitude of the reverse polarity phase displaced charge. It can be appreciated, therefore, that by feeding back the direct current component appearing across the load resistor 81 to the auxiliary winding 85, a corrective current is caused to flow in the auxiliary winding 85 which is in such a direction as to prevent saturation of the supply transformer core. The choke coil 86 connected in series with the auxiliary winding 85 serves to suppress any alternating current induced in the auxiliary winding 85 by the transformer core of the supply transformer 51.

Figure 8:
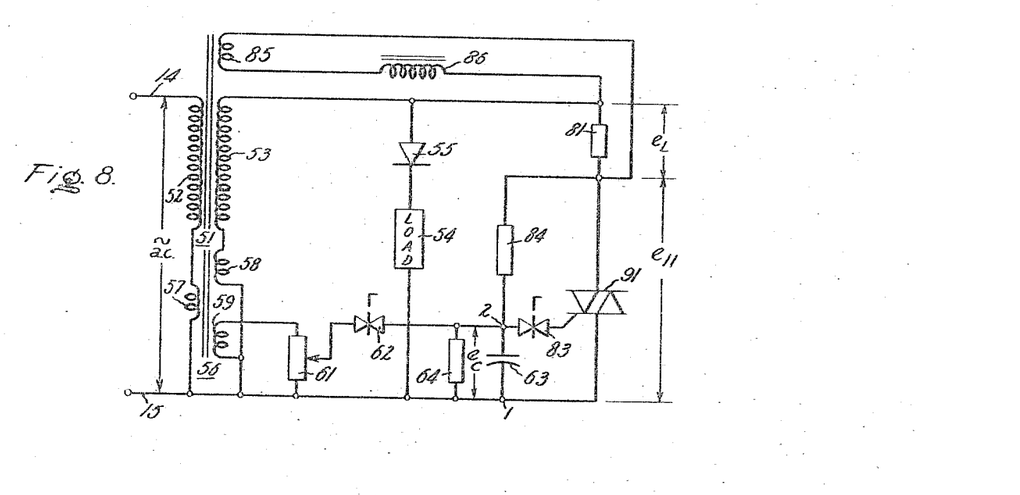
FIGURE 8 is a detailed circuit diagram of a circuit arrangement similar to that of FIGURE 7 but which employs a triac bidirectional conducting power device in place of the power diac.

FIGURE 8 of the drawings illustrates a circuit arrangement similar to that shown in FIGURE 7 wherein a triac bidirectional conductivity controlled conducting device 91 is substituted for the diac bidirectional conducting device 11. The triac bidirectional conducting device 91 is a new triode A-C semiconductor switch which can be triggered into conduction by a gate signal applied to its control gate in a manner similar to the action of a conventional silicon controlled rectifier. The triac differs from the conventional SCR, however, in that it can conduct current in both directions depending upon the polarity of the potential across the load terminals of the device, and gating-on can be accomplished in response to either a positive or negative gate signal. A triac is essentially a five layer NPNPN junction semiconductor device which is manufactured and sold by the Rectifier Components Dept. of the General Electric Co., located in Auburn, N.Y. For a more complete description of the triac, reference is made to Application Note No. 200.35 issued February 1964 entitled "Triac Control for A-C Power" by E. K. Howell, published by the Rectifier Components Dept. of the General Electric Company at Auburn, N.Y. Reference may also be made to an article entitled, "Bilateral SCR Lets Designers Economize on Circuitry," by E. K. Howell appearing in Electronic Design Magazine, Jan. 20, 1964, issue.

By reason of its novel gate firing characteristic, the triac 91 may have its gate electrode connected directly to the firing circuit means comprised by avalanche operated bidirectional gating device 83. Gating device 83 in turn is connected directly across the charging capacitor 63 with the capacitor 63 being connected in series circuit relationship with a limiting resistor 84 across the load terminals of the triac device 91. By reason of this arrangement, the need for the push-pull amplifying means comprised by transistors 69 and 71, their associated coupling transformers, and the direct current power supply connections is eliminated. As a consequence, a much simpler circuit configuration results since the voltage $e_c$ used to fire the triac 91 can now be the voltage $e_c$ appearing across the capacitor 63. In all other respects, the circuit will function in precisely the same manner as the circuit arrangement of FIGURE 7 to develop a direct current component in the load voltage developed across the resistor 81. This direct current component in turn supplies the compensating ampere-turns to the auxiliary winding 85 to unsaturate the supply transformer 51. Since the manner in which such operation is achieved was discussed fully in connection with the circuit arrangement of FIGURE 7, a further detailed description of the manner of operation of the circuit of FIGURE 8 is believed unnecessary. It should also be noted that while the circuit of FIGURE 8 is simpler in construction, the triac 91 is inherently a slower responding device than diac 11 and hence the circuit of FIGURE 7 may be designed to be faster responding than the circuit of FIGURE 8.

Figure 11:
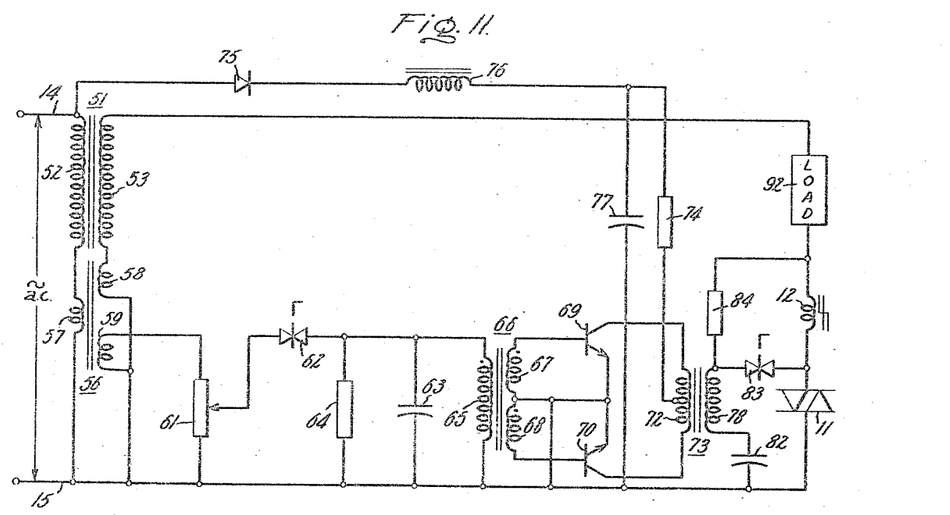
FIGURE 11 is a detailed circuit diagram of a phase controlled alternating current power circuit employing a supply transformer and a power diac for minimizing saturation effects in the supply transformer without requiring modification of the supply transformer itself.

With the circuit arrangements of FIGURES 7 and 8, it is necessary to modify the construction of the supply transformer 51 to incorporate the auxiliary winding 85 around the core thereof. Such modification of the supply transformer may not be possible in certain circumstances, and hence use of the circuit arrangements of FIGURES 7 and 8 will be inappropriate. The circuit arrangement of FIGURE 11 is designed for use in those circumstances where it is not appropriate to modify the construction of the supply transformer either because of economy, or because the nature of the load prevents it. The circuit shown in FIGURE 11 is substantially similar to the circuit arrangement of FIGURE 7 with the exception that the load 92 is connected in series circuit relationship with a diac bidirectional conducting device 11 and small saturable reactor winding 12 across the secondary winding 53 of the supply transformer 51. By connecting the load 92 in this manner, it is possible to correct the load current applied to load 92 itself so as to compensate for saturation effects in the supply transformer 51. The manner in which this is accomplished with the circuit arrangement of FIGURE 11 can best be appreciated in connection with FIGURE 12 of the drawings.

Figure 12:
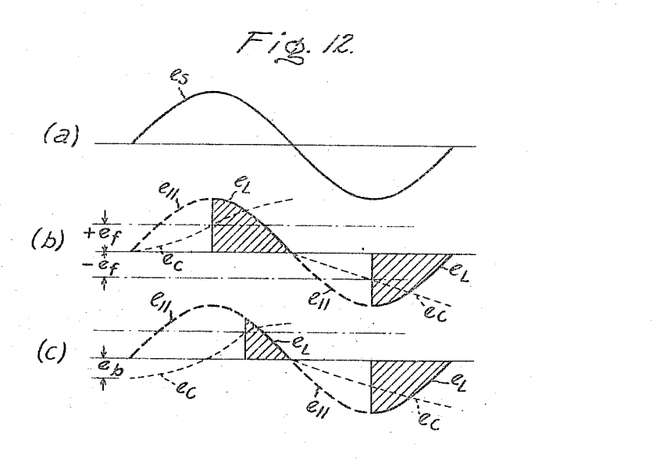
FIGURE 12 is a voltage versus time characteristic curve illustrating the operating characteristics of the circuit shown in FIGURE 11.

FIGURE 12($a$) illustrates the voltage wave shape of the applied alternating current supply potential $e_s$ appearing between terminals 14 and 15. Curve $e_{11}$ in FIGURES 12($b$) and 12($c$) represents the voltage rise across the diac bidirectional conducting device 11 over a full cycle of the applied alternating current supply potential. Curve $e_c$ represents the voltage rise across the capacitor 82 assuming that there is no additional charge applied thereto from the secondary winding 78 of pulse transformer 73. It should be noted that under such condition the voltage on capacitor 82 will rise sufficiently to the firing voltage $e_f$ of device 83 to fire the diac bidirectional conducting device 11 at substantially 90° phase relation with respect to the supply potential during the positive half cycle, and at 270° phase relation during the negative half cycle. As a result, the load voltage supplied to load 92 would have the wave shape $e_L$ shown in FIGURE 12($b$).

In the event that the core of the supply transformer 51 is driven into saturation during either half cycle of the applied alternating current supply potential, the current transformer sensing means 56, avalanche operated bidirectional conducting device 62, and amplifying circuit means 69, 70 will develop control signal pulses of the nature shown in FIGURE 9($c$) which are supplied to the capacitor 82 through output pulse transformer 73. These control current pulses will bias the capacitor 82 in the manner shown in FIGURE 12($c$) of the drawings so that the potential across the capacitor $e_c$ will require a greater length of time to reach the firing potential $e_f$, hence, a greater portion of the positive half cycle of the alternating current supply potential is required to reach the firing potential $e_f$ of the avalanche operated bidirectional conducting device 83. Upon reaching this level, the diac 11 will, of course, be triggered on and rendered conductive in the previously described manner to supply load current to the load 92. This load current will have a wave shape such as is illustrated at $e_L$ in FIGURE 12($c$) of the drawings wherein it can be appreciated that there will be developed a compensating direct current component which will tend to unsaturate the core of the alternating current supply transformer 51.

Figure 13:
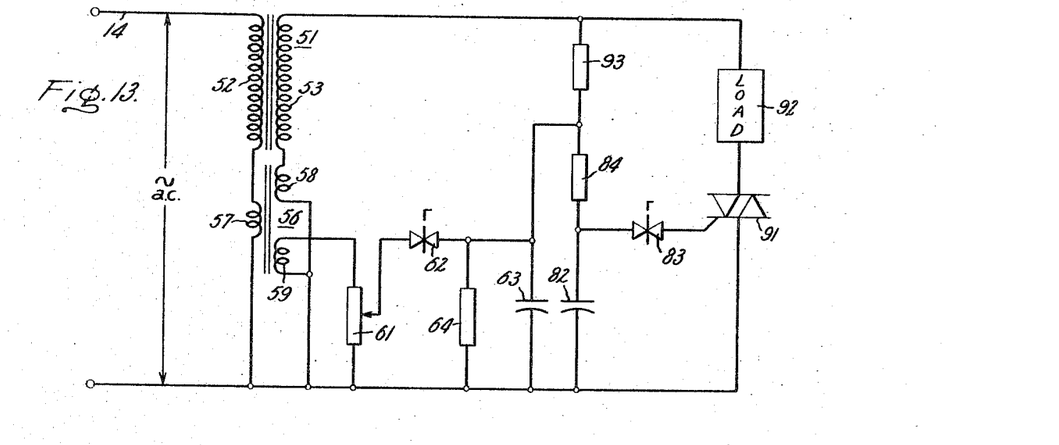
FIGURE 13 is a detailed circuit diagram of a triac version of the circuit shown in FIGURE 11.

FIGURE 13 of the drawings illustrates a form of the circuit arrangement shown in FIGURE 11 wherein a triac bidirectional conducting device 91 is employed in place of the diac 11. Because the triac 91 can be turned on with only a small value gate turn-on signal, it is possible to eliminate the amplifying means comprised by transistors 69 and 70, and apply the control signal pulses developed across the capacitor 63 directly to the charging capacitor 82 through the medium of a pair of voltage dividing resistors 84 and 93 connected in series circuit relationship with the charging capacitor 82 across the terminals of the secondary winding of supply transformer 51. The effect of connection of the circuit in this manner will be to apply a bias charge to the charging capacitor 82 in the manner depicted in FIGURE 12($c$) of the drawings so that the triac 91 will be turned on at a point with respect to the phase of the applied alternating current supply potential to develop the desired load current as represented by the load voltage wave shape $e_L$ illustrated in FIGURE 12($c$). As a consequence of operation of the triac 91 in this manner, a compensating direct current component will be developed in the secondary winding 53 of transformer 51 which will tend to unsaturate the transformer thereby obviating the undesired saturation effects. It should be noted that while the circuit arrangement of FIGURE 13 is considerably simpler from the circuit arrangement of FIGURE 11, the speed of response of the circuit arrangement of FIGURE 11 is greater than that of the FIGURE 13 arrangement due to the fact that the diac 11 is an avalanche operated device which is rendered conductive almost instantaneously across its entire cross section. This is in contrast to the gate controlled triac device 91 which requires a finite time to propagate carriers of conduction across the cross section of the device thereby limiting its speed of response.

From an examination of curve 12($c$) of the drawings, it will be appreciated that in order to derive the compensating direct current component for unsaturating the supply transformer 51 with the circuit arrangements of FIGURES 11 and 13, it is necessary to vary the value of the load current supplied to load 92. By this is meant that the root mean square value of the load current is varied so that in order to utilize the circuit arrangements of FIGURES 11 and 13 it is necessary that the load 92 be able to accommodate such variations in the value of the load current supplied to it. Since there may be certain applications where it is not possible to tolerate such variation of the root mean square value of the load current, the circuit arrangements of FIGURES 14 and 16 were derived wherein the root mean square value of the load current is maintained constant. Nevertheless, with the circuit arrangements of FIGURES 14 and 16, a direct current component is derived which prevents saturation of the supply transformer 51 and maintains the supply transformer 51 operating in an unsaturated condition.

Figure 14:
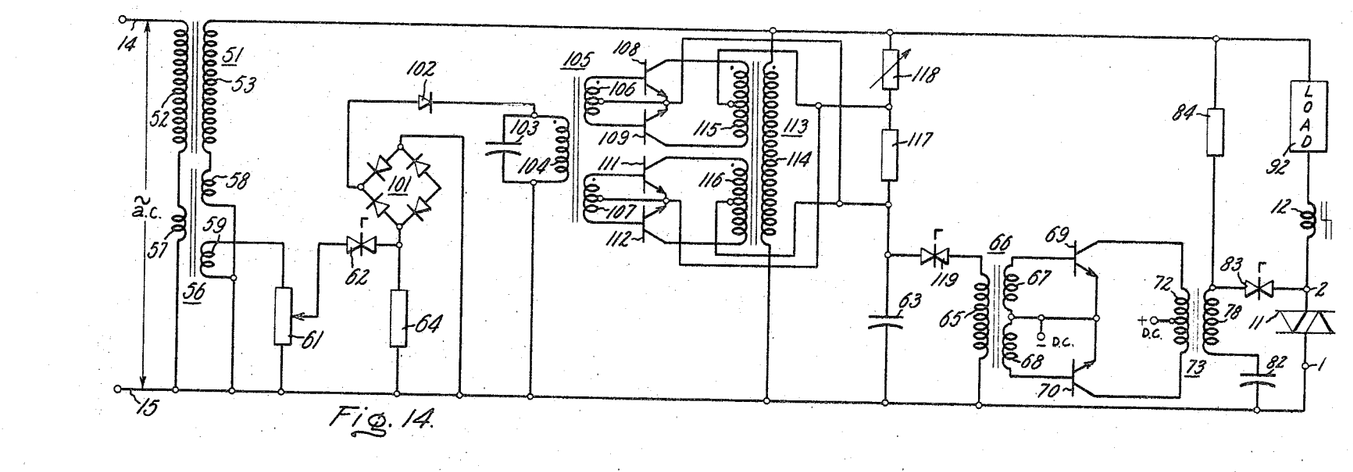
FIGURE 14 is a detailed circuit diagram of a new and improved alternating current power circuit employing a supply transformer and a power diac bidirectional conducting device for minimizing saturation effects in the supply transformer without adversely affecting the load current being supplied to a load.
Figure 16:
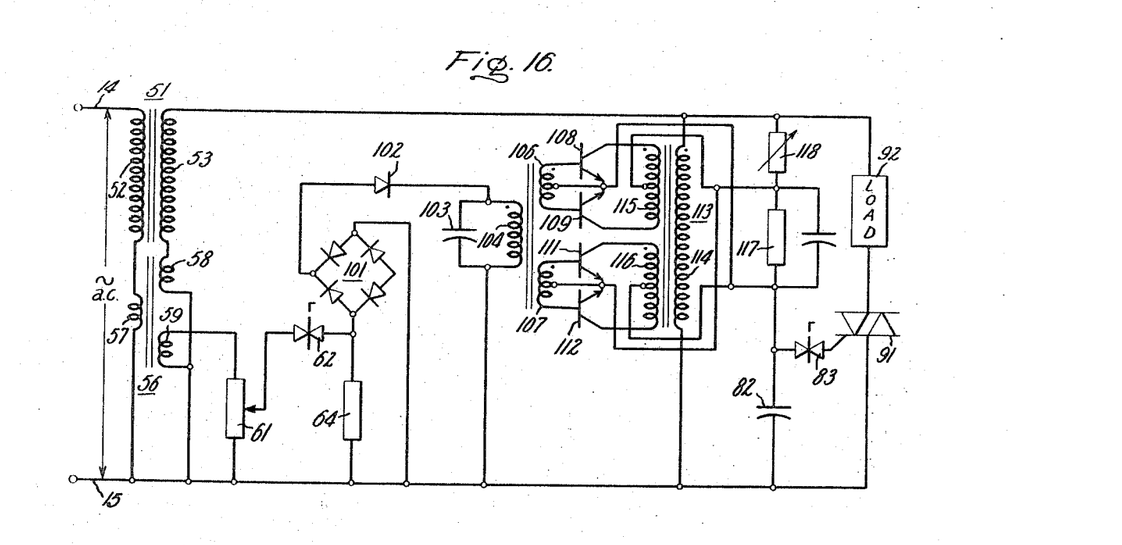
FIGURE 16 is a detailed circuit diagram of a triac version of the circuit arrangement shown in FIGURE 14.

To accomplish the above-mentioned end, the circuit arrangements of FIGURES 14 and 16 have been designed to include a circuit means for maintaining the bias on the charging capacitor 82 throughout a full cycle of the applied alternating current supply potential. For this purpose, the circuit arrangement of FIGURE 14 supplies the control signal pulse developed by the current transformer sensing means 56 through the avalanche operated bidirectional conducting device 62 to a rectifier bridge arrangement 101. The output from the rectifier bridge 101 is coupled through a coupling diode 102 to a tank circuit comprised by a parallel connected capacitor 103 and inductor 104. The inductor 104 comprises the primary winding of a coupling transformer 105 whose split secondary winding halves 106 and 107 are connected in circuit relationship with four NPN junction transistors 108, 109, 111 and 112 to form a phase discriminator. Alternating current power is supplied to the phase discriminator from a supply transformer 113 whose primary winding 114 is connected across the secondary winding 53 of supply transformer 51, and whose split secondary winding halves 115 and 116 are connected, respectively, between the collector electrodes of transistors 108 and 109, and between the collector electrodes of transistors 111 and 112, respectively. Because the phase discriminator comprised by the windings 106, 107, transistors 108 through 112 and windings 115 and 116 is a conventional circuit which has been described in detail in a number of textbooks on electronic circuits, a detailed description of its construction and manner of operation is believed unnecessary. It is believed adequate to point out that the phase discriminator circuit 106–116 will develop across a load resistor 117 connected to the output of the phase discriminator, a bias current whose polarity, magnitude and phase relation is determined by the polarity, magnitude and phase relation of the control signal pulses derived from the output of the current transformer sensing means 56. The load resistor 117 is connected in series circuit relationship with a capacitor 63 and a variable resistor 118 across the secondary winding of the supply transformer 51 so that the charge on the capacitor 63 is determined by the combination of the alternating current supply potential, and the bias derived from the load resistor 117.

Capacitor 63 is connected through a second avalanche operated bidirectional conducting device 119 which is similar in nature to the avalanche operated bidirectional conducting device 62, and is connected across primary winding 65 of the input transformer 66 to a push-pull amplifying means comprised by the transistors 69 and 70. The output of the amplifying means 69 and 70 is supplied through an output coupling transformer 73 and appears across the secondary winding 78 of the transformer. The secondary winding 78 is connected in series circuit relationship with a charging capacitor 82 and limiting resistor 84 across the secondary winding of the supply transformer 51. The juncture of the bias winding 78 and limiting resistor 84 is connected through a third avalanche operated device 83 to the load terminal 2 of the diac bidirectional conducting device 11. The diac bidirectional conducting device 11 is connected in series circuit relationship with the small saturable reactor winding 12 and the load 92 across the secondary winding 53 of supply transformer 51.

Figure 15:
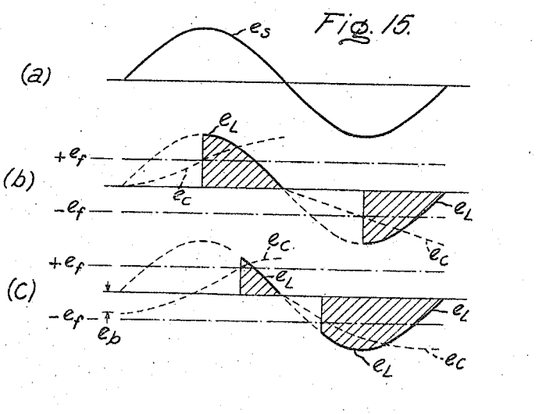
FIGURE 15 is a series of voltage versus time characteristic curves illustrating the manner of operation of the circuit arrangement shown in FIGURE 14.

The operation of the circuit arrangement shown in FIGURE 14 can best be described in connection with the voltage wave shapes shown in FIGURE 15 of the drawings. In FIGURE 15($a$), the alternating current supply potential $e_s$ is illustrated. If there is no bias potential supplied from the current transformer sensing means 56, the charge on capacitor 82 would be represented by the curve $e_c$ in FIGURE 15($b$) and would normally cause the diac 11 to be turned on at 90° and 270° in one cycle of the alternating current supply potential in the same manner shown with the curve in FIGURE 12($b$) of the drawings. However, in the event that the current transformer sensing means 56 derives output current signal pulses representative of the magnetizing current flowing in the secondary winding 53 of supply transformer 51, these current signal pulses will develop across the load resistor 117 a bias potential which will be supplied through the amplifying means 69 and 70 to the secondary winding 78 of the output pulse transformer 73. Because of the oscillatory nature of the tank circuit 103, 104, the bias potential developed across load resistor 117 will be maintained continuously throughout one entire cycle of the supply alternating current potential $e_s$.

The effect of maintaining the bias charge on capacitor 63 throughout one entire cycle in this manner is best illustrated in FIGURE 15($c$) of the drawings wherein it can be seen that because of the bias charge on 63 during the positive half cycle of the supply alternating current potential, a longer period of time will be required for the charge on the capacitor 63 (and hence the charge on capacitor 82), to reach the firing potential $+e_f$ of the avalanche operated bidirectional conducting device 119 and 83 to turn on diac 11. During this half cycle, the operation of the circuit will be similar to the operation of the circuit previously described. However, during the negative half cycle of the supply alternating current potential, the charge on the capacitors 63 and 82 again will be biased negative to the value represented by $e_b$ so that during the negative half cycle a lesser period of time will be required for the charge on the capacitor to reach the negative firing potential $-e_f$ thereby proportionately increasing the load current value during the negative half cycle of the supply alternating current potential in the manner shown by the curve $e_L$ in FIGURE 15($c$) of the drawings. As a consequence, it can be appreciated that while the compensating direct current component is still developed in the load current circuit, the total load current flowing through the load 92 is maintained constant. That is to say the root mean square value of the load current is maintained constant because where the load current is decreased during the positive half cycle in order to derive the desired compensating direct current component, it is proportionally increased during the following negative half cycle to thereby maintain the root mean square value of the load current constant over a full cycle of the alternating current supply potential. It should also be noted that while a tuned oscillatory circuit has been illustrated as the means for maintaining the charge on capacitor 63 (and hence 82) over a complete cycle of the alternating current supply potential, other similar means might be employed. For example, a bank of various direct current voltage levels could be selectively switched into circuit relationship with the capacitor 63 by the control signal pulses from the current transformer. Other equivalent circuit arrangements are believed to be equally obvious.

FIGURE 16 of the drawings is a triac version of the circuit arrangement of FIGURE 14 wherein the triac bidirectional conducting device 91 is substituted in place of the diac 11. As a consequence, of this substitution, the circuit arrangement can be considerably simplified by elimination of the amplifying circuit means and its associated direct current power supply as well as elimination of one of the avalanche operated bidirectional conducting switches 119. In other respects, the operation of the circuit of FIGURE 16 is identical to that described with relation to the circuit of FIGURE 14 and hence will not be again described in detail.

From the foregoing description, it can be appreciated that the invention provides a family of new and improved phase controlled alternating current power circuits employing supply transformers and solid state bidirectional conducting devices which are utilized to overcome saturation effects of the supply transformer. As a consequence, the need for over designed supply transformer is obviated.

Having described several embodiments of the new and improved phase control alternating current power circuit constructed in accordance with the invention, it is believed obvious that other modifications and variations of the invention are possible in light of the above teachings. It is, therefore, to be understood that changes being made in the particular embodiments of the invention described which are within the full intended scope of the invention are defined by the amended claims.

What I claim as new and desire to secure by Letters Patent of the United States is:

1. An alternating current power circuit including in combination a supply transformer having an undesired direct current component flowing in the secondary winding thereof during one phase of an alternating current supply potential applied to the supply transformer, current sensing means comprising a current transformer operatively coupled to the supply transformer for sensing the undesired direct current component and deriving an output control signal which has a polarity, magnitude, and phase dependent upon the polarity, magnitude, and phase of the undesired direct current component flowing in the secondary winding of the supply transformer, a conductivity controlled solid state bidirectional conducting device operatively coupled with the secondary windings of the supply transformer, firing circuit means therefor responsive to the control signal derived from said sensing means for cyclically turning on the bidirectional conducting device at different phases of the positive and negative half cycles of the alternating current supply potential to thereby derive a compensating direct current component for minimizing the undesired direct current component flowing in the secondary winding of the supply transformer, and means for applying said compensating direct current component to the supply transformer.

2. The combination set forth in claim 1 wherein the last-mentioned means comprises an auxiliary winding inductively coupled to at least the secondary winding of the supply transformer and connected in circuit relationship with the conductivity controlled bidirectional conducting device for supplying ampere turns to the core of the supply transformer in a direction to unsaturate the core of the supply transformer to thereby obviate the effects of the undesired direct current component flowing in the secondary winding.

3. The combination set forth in claim 1 wherein to provide the last-mentioned means the conductivity controlled bidirectional conducting device is operatively connected in series circuit relationship with the load to be supplied across the secondary winding of the supply transformer and wherein the load current itself is controlled by controlling the phase of the turn-on of the bidirectional conducting device with respect to the supply alternating current potential to thereby obviate the effects of the undesired direct current component flowing in the secondary winding.

4. An alternating current power circuit including in combination a supply transformer having an undesired direct current component flowing in the secondary winding thereof during one phase of an alternating current supply potential applied to the supply transformer, current sensing means comprising a current transformer operatively coupled to the supply transformer for sensing the undesired direct current component and deriving an output control signal pulse which has a polarity, magnitude and phase dependent upon the polarity, magnitude, and phase of the undesired direct current component flowing in the supply transformer when measured with respect to the supply alternating current potential applied to the supply transformer, an avalanche operated conductivity controlled bidirectional conducting device operatively coupled to the current transformer sensing means for developing control signal pulses of a given magnitude or greater, signal pulse amplifying means operatively coupled to the output of the avalanche operated conductivity controlled bidirectional conducting device, a diac bidirectional conducting device operatively coupled with the secondary windings of the supply transformer, firing circuit means therefor coupled to the output of the signal pulse amplifying means and thereby responsive to the control signal pulses derived from said sensing means for cyclically turning on the diac bidirectional conducting device at different phases of the positive and negative half cycles of the alternating current supply potential to thereby derive a compensating direct current component for minimizing the undesired direct current component flowing in the secondary winding of the supply transformer, and means for applying said compensating direct current component to the supply transformer comprising an auxiliary winding inductively coupled to at least the secondary winding of the supply transformer and wound on the same core therewith and operatively connected to the diac bidirectional conducting device for applying ampere-turns to the core of the supply transformer in a direction to unsaturate the core of the transformer to thereby obviate the undesired effects of the undesired D-C component flowing in the secondary winding thereof.

5. An alternating current power circuit including in combination an alternating current supply transformer having an undesired direct current component flowing in the secondary winding thereof which tends to saturate the core of the transformer in one or the other half cycles of the alternating current supply potential, current transformer sensing means operatively coupled to the supply transformer for sensing the undesired direct current component and deriving output control signal pulses having a polarity, magnitude and phase dependent upon the polarity, magnitude, and phase of the undesired direct current component flowing in the secondary winding of the supply transformer, an avalanche operated conductivity controlled bidirectional conducting device operatively coupled to the output of the current transformer sensing means for deriving output control signal pulses of a given magnitude or greater, a triac bidirectional conducting device operatively coupled with the secondary windings of the supply transformer, firing circuit means therefor responsive to the control signal pulses derived from the output of said avalanche operated conductivity controlled bidirectional conducting device for cyclically turning on the triac bidirectional conducting device at different phases of the positive and negative half cycles of the alternating current supply potential to thereby derive a compensating direct current component for minimizing the undesired direct current component flowing in the secondary winding of the supply transformer, and means for applying said compensating direct current component to the circuit comprising an auxiliary winding on the core of the supply transformer and operatively connected in circuit relationship with the triac bidirectional conducting device for supplying ampere-turns to the core of the supply transformer to unsaturate the core and thereby obviate the undesired effects of the undesired direct current component flowing in the secondary winding of the supply transformer.

6. An alternating current power circuit including in combination an alternating current supply transformer having an undesired direct current component flowing in the secondary winding thereof during one phase of an alternating current supply potential applied to the supply transformer, current transformer sensing means operatively coupled to the alternating current supply transformer for deriving output control signal pulses having a polarity, magnitude and phase dependent upon the polarity, magnitude, and phase of the undesired direct current component flowing in the secondary winding of the supply transformer, an avalanche operated conductivity controlled bidirectional conducting device operatively coupled to the output of the current transformer sensing means for deriving output control signal pulses of a given magnitude or larger, signal amplifying means operatively coupled to the output of said avalanche operated conductivity controlled bidirectional conducting device for amplifying the control signal pulses, a diac bidirectional conducting device operatively connected in series circuit relationship with the secondary windings of the alternating current supply transformer, firing circuit means therefor coupled to the output of the signal amplifying means and thereby responsive to the control signal pulses derived from said sensing means for cyclically turning on the diac bidirectional conducting device at different phases of the positive and negative half cycles of the alternating current supply potential to thereby derive a compensating direct current component for minimizing the undesired direct current component flowing in the secondary winding of the supply transformer, and means for applying said compensating direct current component to the supply transformer by connecting the load in series circuit relationship with the diac bidirectional conducting device and the secondary winding of the supply transformer to control the load current.

7. An alternating current power circuit employing conductivity controlled bidirectional conducting devices including in combination an alternating current supply transformer having an alternating current supply potential applied thereto and an undesired direct current component flowing in the secondary winding thereof which tends to saturate the core of the supply transformer during one of the half cycles of the alternating current supply potential, current transformer sensing means operatively coupled to the supply transformer for deriving control signal pulses having a polarity, magnitude and phase dependent upon the polarity, magnitude, and phase of the undesired direct current component flowing in the secondary winding of the supply transformer, an avalanche operated conductivity controlled bidirectional conducting device operatively coupled to the output of the current transformer sensing means for deriving control signal pulses having a given magnitude or larger, a triac bidirectional conducting device having its gate electrode and firing circuit means therefor operatively coupled to the output of the avalanche operated conductivity controlled bidirectional conducting device, said triac bidirectional conducting device being connected in series circuit relationship with the secondary windings of the supply transformer so that its firing circuit means is responsive to the control signal pulses derived from the output of said avalanche operated conductivity controlled bidirectional conducting device for cyclically turning on the triac bidirectional conducting device at different phases of the positive and negative half cycles of the alternating current supply potential to thereby derive a compensating direct current component for minimizing the undesired direct current component flowing in the secondary winding of the supply transformer, and means for applying said compensating direct current component to the supply transformer by connecting the load in series circuit relationship with the triac bidirectional conducting device and the secondary winding of the supply transformer to control the load current.

8. An alternating current power circuit including in combination an alternating current supply transformer having an alternating current supply potential applied thereacross and having an undesired direct current component flowing in the secondary winding thereof which tends to saturate the core of the supply transformer on one of the half cycles of the supply alternating current potential, current transformer sensing means operatively coupled to the supply transformer for deriving control signal pulses having a polarity, magnitude and phase dependent upon the polarity, magnitude, and phase of the undesired direct current component flowing in the secondary winding of the supply transformer, an avalanche operated conductivity controlled bidirectional conducting device operatively coupled to the output of the current transformer sensing means for deriving output control signal pulses having a given magnitude or greater, charging circuit means operatively coupled across the secondary winding of the supply transformer and to the output of the avalanche operated conductivity controlled bidirectional conducting device for developing an output firing potential dependent upon the supply alternating current potential and the control signal pulses derived from the current transformer sensing means by the avalanche operated conductivity controlled bidirectional conducting device, circuit means interconnecting the avalanche operated conductivity controlled bidirectional conducting device and the charging circuit means for retaining the charge on the charging circuit means due to the control signal pulses derived by the current transformer sensing means over a complete cycle of the supply alternating current potential, firing circuit means including amplifying means operatively coupled to the charging circuit means for deriving a firing pulse from the charging circuit means upon the potential of the charging circuit means reaching a predetermined value, a diac bidirectional conducting device operatively connected in series circuit relationship across the secondary winding of the supply transformer, said diac bidirectional conducting device being operatively coupled across the output of the firing circuit means for cyclically turning it on at different phases of the positive and negative half cycles of the alternating current supply potential to thereby derive a compensating direct current component for minimizing the undesired direct current component flowing in the secondary winding of the supply transformer, and means for applying said compensating direct current component to the supply transformer by connecting the load in series circuit relationship with the diac bidirectional conductive device and the secondary winding of the supply transformer to control the load current.

9. An alternating current power circuit including in combination an alternating current supply transformer having an alternating current supply potential applied thereto and an undesired direct current component flowing in the secondary winding thereof which tends to saturate the core of the supply transformer during one of the phases of the supply alternating current potential, current transformer sensing means operatively coupled to the supply transformer for deriving control signal pulses having a polarity, magnitude and phase dependent upon the direct current component flowing in the secondary winding of the supply transformer, an avalanche operated conductivity controlled bidirectional conducting device operatively coupled to the output of the current transformer sensing means for deriving control signal pulses having a given magnitude or greater, charging circuit means operatively coupled to the output of the avalanche operated conductivity controlled bidirectional conducting device and responsive to the alternating current supply potential for developing a firing potential that is dependent upon the value of the supply alternating current potential and the value of the control signal pulses derived from the avalanche operated conductivity controlled bidirectional conducting device, circuit means interconnecting the avalanche operated conductivity controlled bidirectional conducting device and the charging circuit means for maintaining the potential on the charging circuit means determined by the value of the control signal pulses derived from the current transformer sensing means over a full cycle of the alternating current supply potential, firing circuit means operatively coupled to the charging circuit means and controlled by the charging circuit means for deriving a firing potential, a triac bidirectional conducting device operatively connected in series circuit relationship with a load across the secondary winding of the supply transformer, the control gate of the triac bidirectional conducting device being operatively connected to the firing circuit means whereby the phase of the turn-on time of the triac bidirectional conducting device is controlled with respect to the supply alternating current potential to thereby obviate the undesired effects of the direct current component flowing in the secondary winding of the supply transformer.

References Cited

UNITED STATES PATENTS

| | | | |
|---|---|---|---|
| 3,159,766 | 12/1964 | Harpley | 315—100 |
| 3,188,487 | 6/1965 | Hutson | 307—88.5 |
| 3,188,490 | 6/1965 | Hoff et al. | 307—88.5 |
| 3,210,641 | 10/1965 | Hutson | 321—46 |
| 3,242,416 | 3/1966 | White | 323—22 |
| 3,263,092 | 7/1966 | Knauss | 323—22 |

JOHN F. COUCH, *Primary Examiner.*

M. L. WACHTELL, *Assistant Examiner.*